(12) United States Patent
Desch et al.

(10) Patent No.: US 10,871,201 B2
(45) Date of Patent: Dec. 22, 2020

(54) PLANETARY TRANSMISSION

(71) Applicant: DESCH Antriebstechnik GmbH & Co. KG, Arnsberg (DE)

(72) Inventors: Hendrik Peter Desch, Arnsberg (DE); Markus Wilmes, Arnsberg (DE)

(73) Assignee: DESCH Antriebstechnik GmbH & Co. KG, Arnsberg (DE)

( * ) Notice: Subject to any disclaimer, the term of this patent is extended or adjusted under 35 U.S.C. 154(b) by 94 days.

(21) Appl. No.: 15/755,872

(22) PCT Filed: Aug. 15, 2016

(86) PCT No.: PCT/EP2016/069342
§ 371 (c)(1),
(2) Date: Feb. 27, 2018

(87) PCT Pub. No.: WO2017/036775
PCT Pub. Date: Mar. 9, 2017

(65) Prior Publication Data
US 2018/0328453 A1    Nov. 15, 2018

(30) Foreign Application Priority Data

Sep. 4, 2015   (EP) .................................... 15183921

(51) Int. Cl.
*F16H 57/033* (2012.01)
*F16H 1/28* (2006.01)
(Continued)

(52) U.S. Cl.
CPC ............... *F16H 1/28* (2013.01); *B60K 6/105* (2013.01); *F16H 57/033* (2013.01);
(Continued)

(58) Field of Classification Search
CPC ....... F16H 57/0025; F16H 2057/02073; F16H 1/28; F16H 57/082; F16H 2057/005; B60K 6/105; B30B 1/266
(Continued)

(56) References Cited

U.S. PATENT DOCUMENTS 2,998,735 A * 9/1961 Elfes .................... B60K 17/046
475/346
4,249,431 A * 2/1981 Pruvot .................. F16H 1/2809
475/345
(Continued)

FOREIGN PATENT DOCUMENTS

| CN | 103148200 A | 6/2013 |
| CN | 103775566 A | 5/2014 |

(Continued)

OTHER PUBLICATIONS

English translation of JP2014077247A; https://translationportal.epo.org; Aug. 21, 2019 (Year: 2019).*
(Continued)

*Primary Examiner* — Roger L Pang
(74) *Attorney, Agent, or Firm* — Edell, Shapiro & Finnan, LLC (57) ABSTRACT

A planetary transmission for transmitting drive power to a work machine, comprising a plurality of planetary gearwheels, a plurality of planetary shafts and at least one planetary carrier, the planetary gearwheels being arranged in each case rotatably on one of the planetary shafts, and the planetary shafts being fastened in each case to the planetary carrier, characterized in that the planetary carrier is configured for a releasable connection to a work machine shaft.

14 Claims, 5 Drawing Sheets

(51) Int. Cl.
*B60K 6/10* (2006.01)
*F16H 57/08* (2006.01)
*B30B 1/26* (2006.01)
*F16H 57/00* (2012.01)
*F16H 57/02* (2012.01)
*F16F 15/30* (2006.01)

(52) U.S. Cl.
CPC ............ *F16H 57/082* (2013.01); *B30B 1/266* (2013.01); *F16F 15/30* (2013.01); *F16H 57/0025* (2013.01); *F16H 2057/005* (2013.01); *F16H 2057/02073* (2013.01); *Y02T 10/62* (2013.01)

(58) Field of Classification Search
USPC ...................................... 475/331, 348, 5, 149
See application file for complete search history.

(56) References Cited

U.S. PATENT DOCUMENTS

| | | | | |
|---|---|---|---|---|
| 5,435,793 | A * | 7/1995 | Varela | B60K 17/046 180/244 |
| 6,817,963 | B1 * | 11/2004 | Solka | B60K 17/046 180/372 |
| 8,235,857 | B2 | 8/2012 | Van Druten | |
| 2008/0282824 | A1 | 11/2008 | Van Druten | |
| 2011/0230305 | A1 * | 9/2011 | Miyawaki | G03G 15/757 475/331 |
| 2017/0313181 | A1 * | 11/2017 | Isono | B60K 1/02 |

FOREIGN PATENT DOCUMENTS

| | | |
|---|---|---|
| DE | 102010018528 A1 | 10/2011 |
| DE | 102011118410 A1 | 5/2013 |
| DE | 102011119773 A1 | 6/2013 |
| EP | 2199072 A2 | 6/2010 |
| JP | 5783747 A | 5/1982 |
| JP | 6131757 A | 2/1986 |
| JP | 6217447 A | 1/1987 |
| JP | 62204035 A | 9/1987 |
| JP | 05041848 B2 | 6/1993 |
| JP | 0719653 U | 4/1995 |
| JP | 20059614 A | 1/2005 |
| JP | 2012233488 A | 11/2012 |
| JP | 201477247 A | 5/2014 |
| KR | 20080040711 A | 5/2008 |
| KR | 101312137 B1 | 9/2013 |

OTHER PUBLICATIONS

English translation of JP2012233488A; https://translationportal.epo.org; Aug. 21, 2019 (Year: 2019).*
English translation of EP21999072A2; https://translationportal.epo.org; Aug. 21, 2019 (Year: 2019).*
International Search Report for corresponding PCT Application No. PCT/EP2016/069342, 4 pages, dated Feb. 12, 2016.
Office Action in corresponding Chinese Patent Application No. 201680059203.5, dated Mar. 24, 2020, with English translation.
Office Action in corresponding Japanese Patent Application No. 2018-530957, dated Feb. 4, 2020, with English translation.

* cited by examiner

PLANETARY TRANSMISSION

FIELD OF THE INVENTION

The present invention relates to a planetary transmission for transmitting drive power to a work machine as described herein. In particular, a drive torque and a drive power output can result from the drive power.

BACKGROUND

Planetary transmissions are used in the prior art, in order to transmit drive power from a drive means (for example, an engine/motor) to a work machine (such as a press). One advantage of planetary transmissions is the particularly compact overall design and the high load-bearing capability, with the result that even high drive powers can be transmitted.

In known planetary transmissions, planetary gearwheels circulate about a sun gearwheel. Each of the planetary gearwheels is mounted rotatably on a planetary shaft. The planetary shaft is connected at its two ends to a planetary carrier. The planetary carrier serves as an output shaft and is therefore coupled directly to the work machine.

Known planetary transmissions are mounted as an entire installation-ready system on the work machine. This means a relatively high assembly complexity. In particular, the dismantling of individual components is relatively complicated as a result of known designs, with the result that the maintenance of known planetary transmissions is complicated.

SUMMARY OF THE INVENTION

In contrast, the invention is based on the object of providing a simplified assembly method, a planetary gear mechanism which can be assembled more easily, and a system comprising a planetary transmission of this type and a press.

Said object is achieved by way of a method as disclosed herein, a planetary transmission as disclosed herein and a system as disclosed herein. Embodiments of the invention are specified herein.

The method according to the invention relates to the assembly of a system which comprises a planetary transmission and a work machine. The planetary transmission comprises a first and a second module. The first module comprises a plurality of planetary gearwheels, a plurality of planetary shafts and at least one planetary carrier. The second module can comprise, for example, the remaining components of the planetary transmission. The remaining components can be an internal gearwheel, a sun gearwheel, a drive shaft, a clutch, a brake and/or a flywheel.

First of all, the first module is fastened releasably to the work machine shaft. It is possible, in particular, that the planetary carrier is fastened releasably to the work machine shaft. Here, a releasable fastening is understood to mean, in particular, a fastening which can be released without destruction. This can mean that neither the work machine shaft nor the first module is damaged and/or their/its function is impaired during release of the fastening. In particular, non-positive or positively locking fastenings may be suitable as releasable fastenings. It is possible that the releasable fastening can be carried out and released multiple times, without the stability of the fastening being impaired.

After the first module has been fastened releasably to the work machine shaft, the first module is fastened releasably to the second module. It is possible, in particular, that the first module is fastened releasably to the internal gearwheel of the second module. Said fastening can be, in particular, positively locking. For example, an external toothing system of the planetary gearwheels can engage into an internal toothing system of the internal gearwheel. Said positively locking fastening can be subject to play.

It is possible that the first module is fastened to the work machine shaft in such a way that the planetary carrier is mounted on the work machine shaft in a floating manner. Moreover, it is possible that the planetary carrier is of single-cheek configuration. Within the context of this description, this is understood to mean, in particular, that the planetary shafts are connected to the planetary carrier in each case only at precisely one end of the respective planetary shaft.

It is provided according to the invention that the planetary transmission comprises a plurality of planetary gearwheels, a plurality of planetary shafts and at least one planetary carrier. The planetary gearwheels are in each case arranged rotatably on one of the planetary shafts. The planetary shafts are fastened in each case to the planetary carrier.

It is provided according to the invention that the planetary carrier is configured for a releasable connection to a work machine shaft. Here, a releasable connection is understood to mean, in particular, a connection which can be released without destruction. This can mean that neither the work machine shaft nor the planetary carrier is damaged and/or their/its function is impaired during the release of the connection. In particular, non-positive or positively locking connections may be suitable as releasable connections. It is possible that the releasable connection can be established and released multiple times, without the stability of the connection being impaired.

The assembly of the planetary transmission is simplified by way of the releasable connection of the planetary carrier to the work machine shaft. During the assembly, first of all the planetary carrier with the planetary shafts which are fastened to it and the planetary gearwheels can be fastened as a first module to the work machine shaft. This can advantageously take place at the location of use of the work machine, since the assembly is particularly simple on account of the releasable connection. The remaining components of the planetary transmission can then be fastened as a second module to the first module.

According to one embodiment of the invention, the planetary carrier can be configured for a positively locking or non-positive connection to the work machine shaft. Within the context of this description, the work machine shaft is understood to mean, in particular, a shaft of the work machine, which shaft can be connected to the planetary carrier in a non-positive or positively locking manner. The work machine shaft can be, for example, an eccentric shaft. This can be the case, in particular, if the work machine is a press.

According to one embodiment of the invention, the planetary shafts can be fastened to the planetary carrier in each case at precisely one end of the respective planetary shaft. Here, an end of the planetary shaft is understood to mean, in particular, an end-side region of the planetary shaft, which end-side region can be a third or a quarter as long as the entire planetary shaft. It is possible, in particular, that the planetary carrier protrudes into the planetary shaft. As an alternative, the planetary shaft can protrude into the planetary carrier or can protrude through the planetary carrier.

It is therefore possible that the planetary carrier is fastened to only precisely one end of the respective planetary shaft, and not to the two ends. As a result, a more compact overall design is made possible, since no installation space is required for the fastening at the second end of the planetary shaft. In particular, multiple-stage planetary transmissions of this kind, for example with a transmission ratio of i≥10, can be of particularly compact and inexpensive configuration. Moreover, the mass which rotates during the operation of the planetary transmission is reduced, with the result that the planetary carrier has a lower moment of inertia, as a result of which the planetary carrier can already be accelerated and braked by way of a lower force or in a shorter time. Since the planetary carrier is fastened merely to one end of the respective planetary shaft, assembly and material costs are saved. Moreover, the assembly of the planetary transmission on the work machine is simplified. In the case of servicing, in addition, the access to the planetary transmission and the dismantling of the planetary transmission are simplified.

According to one embodiment of the invention, the planetary carrier can have an internal toothing system. The internal toothing system can be configured to engage into an external toothing system of the work machine shaft. A fastening of this type of the planetary carrier to the work machine shaft is advantageous, in particular, in order to reduce radial movements which occur at the planetary carrier during operation. The toothing systems have a small amount of play, as is usually unavoidable in practice in the case of toothing systems. If, in particular, the outer and the inner toothing systems are lubricated with a lubricating medium (for example, oil), stress peaks which occur are reduced.

According to one embodiment of the invention, the planetary transmission can comprise a securing means. The planetary carrier can be secured by way of the securing means against an axial displacement relative to the work machine shaft. Since the second end of the planetary shafts is not connected in each case to the planetary carrier, the planetary carrier might be displaced axially relative to the work machine shaft and in some circumstances even slip off it without a securing action of this type. This is prevented by way of the use of the securing means. For example, securing rings can be used as securing means.

Regardless of whether the planetary carrier can be fastened to the work machine shaft in a positively locking or non-positive manner, the mounting of the planetary carrier can be called a floating mounting on the eccentric shaft. Since the planetary carrier is fastened only at precisely one end of the planetary shafts, the mounting advantageously takes place on the work machine shaft.

According to one embodiment of the invention, the planetary transmission can comprise a clamping means. The clamping means can be configured for fastening the planetary carrier to the work machine shaft. Here, a clamping means is understood to mean, in particular, a means which is configured for fastening the planetary carrier to the drive machine shaft by way of a clamping force. This is a type of fastening of the planetary carrier to the work machine shaft which can be assembled in a particularly simple manner.

According to one embodiment of the invention, the clamping means can be configured as a clamping set. The use of a clamping set makes fastening of the planetary carrier to the work machine shaft possible in a manner which is particularly reliable and simple to assemble.

According to one embodiment of the invention, that end of the respective planetary shaft, to which the planetary carrier is fastened, can face the work machine in the installed state of the planetary transmission. This is particularly advantageous for a compact overall design of the planetary transmission.

According to one embodiment of the invention, the work machine can be configured as a press. The use of the planetary transmission for a press is particularly advantageous on account of the compact overall design.

It is possible that the planetary transmission comprises an internal gearwheel and a sun gearwheel. The internal gearwheel and the planetary gearwheels can engage into one another, and the sun gearwheel and the planetary gearwheels can engage into one another.

According to one embodiment of the invention, the planetary transmission can comprise a housing. The planetary carrier can be arranged partially outside the housing. The planetary carrier can preferably be arranged mostly outside the housing. This can mean, in particular, that more than 50% or more than 75%, in particular more than 90%, of the mass or the volume of the planetary carrier is arranged outside the housing. An arrangement of this type of the planetary carrier makes assembly and maintenance of the planetary transmission particularly convenient.

According to one embodiment of the invention, the planetary carrier can be configured as an output shaft or can comprise an output shaft. The output shaft is configured to transmit the drive power to the work machine.

The system in one embodiment comprises a drive means, a work machine, for example a press, and a planetary transmission according to one embodiment of the invention. The planetary transmission is configured to transmit power output which is provided by way of the drive means to the work machine.

According to one embodiment of the invention, the work machine can comprise a work machine shaft. The planetary carrier can be fastened to the work machine shaft. It is possible, in particular, that the planetary carrier is mounted rotatably on the work machine shaft.

According to one embodiment of the invention, the system can comprise a clutch and a brake, in particular a clutch/brake combination.

According to one embodiment of the invention, the system can comprise a flywheel which is configured to be driven by the drive means and to transmit the power output which is provided by the drive means to the planetary transmission. In particular, the power output can be transmitted via the clutch.

It is also possible, however, that a planetary transmission according to one embodiment of the invention is coupled to a motor, for example a servomotor, the power of which acts directly on the input shaft of the planetary transmission.

BRIEF DESCRIPTION OF THE DRAWINGS

Further features and advantages of the present invention will become clear using the following description of preferred exemplary embodiments with reference to the appended figures. Here, the same designations are used for identical or similar components and for components with identical or similar functions. In the figures.

DETAILED DESCRIPTION OF THE INVENTION

The planetary transmission 100 from the prior art (see FIGS. 1 and 2) serves to transmit drive power to a work machine 101 which can be a press, for example. The planetary transmission 100 comprises a sun gearwheel 103, an internal gearwheel 104, a plurality of planetary gearwheels 105, a plurality of planetary shafts 106 and a planetary carrier 107. Here, the planetary shafts 106 are fastened at their two ends (on the right and left in FIG. 1 and FIG. 2) to the planetary carrier 107.

Figure 1:
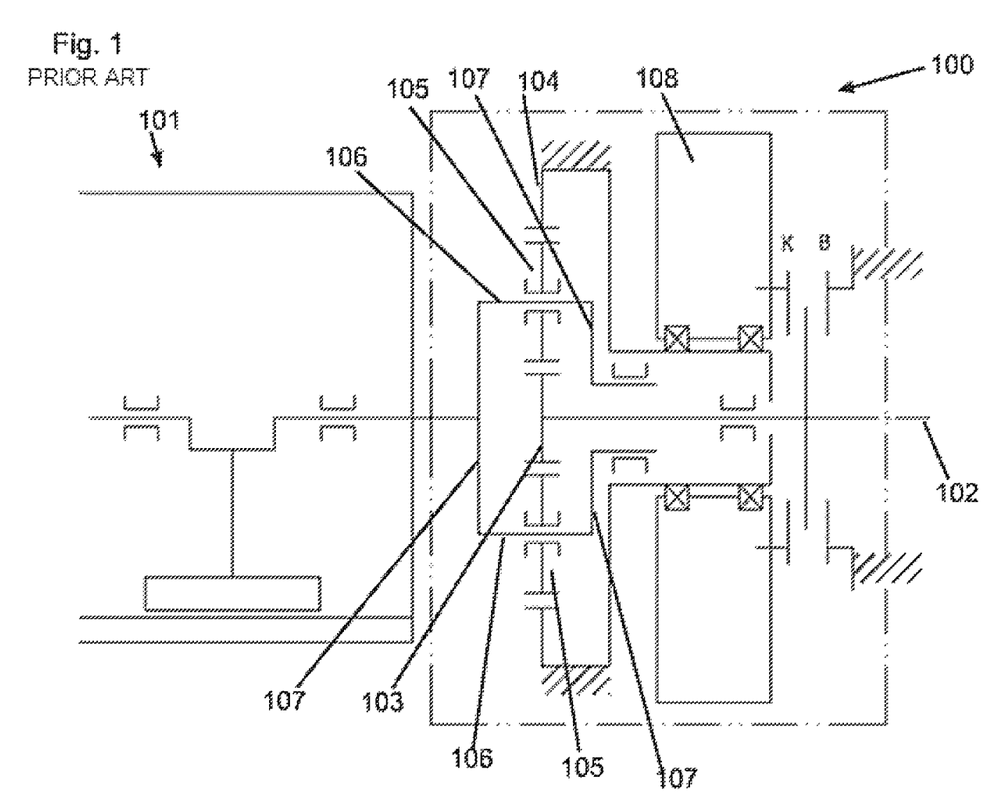
FIG. 1 shows a diagrammatic simplified sectional illustration of a planetary transmission from the prior art.
Figure 2:
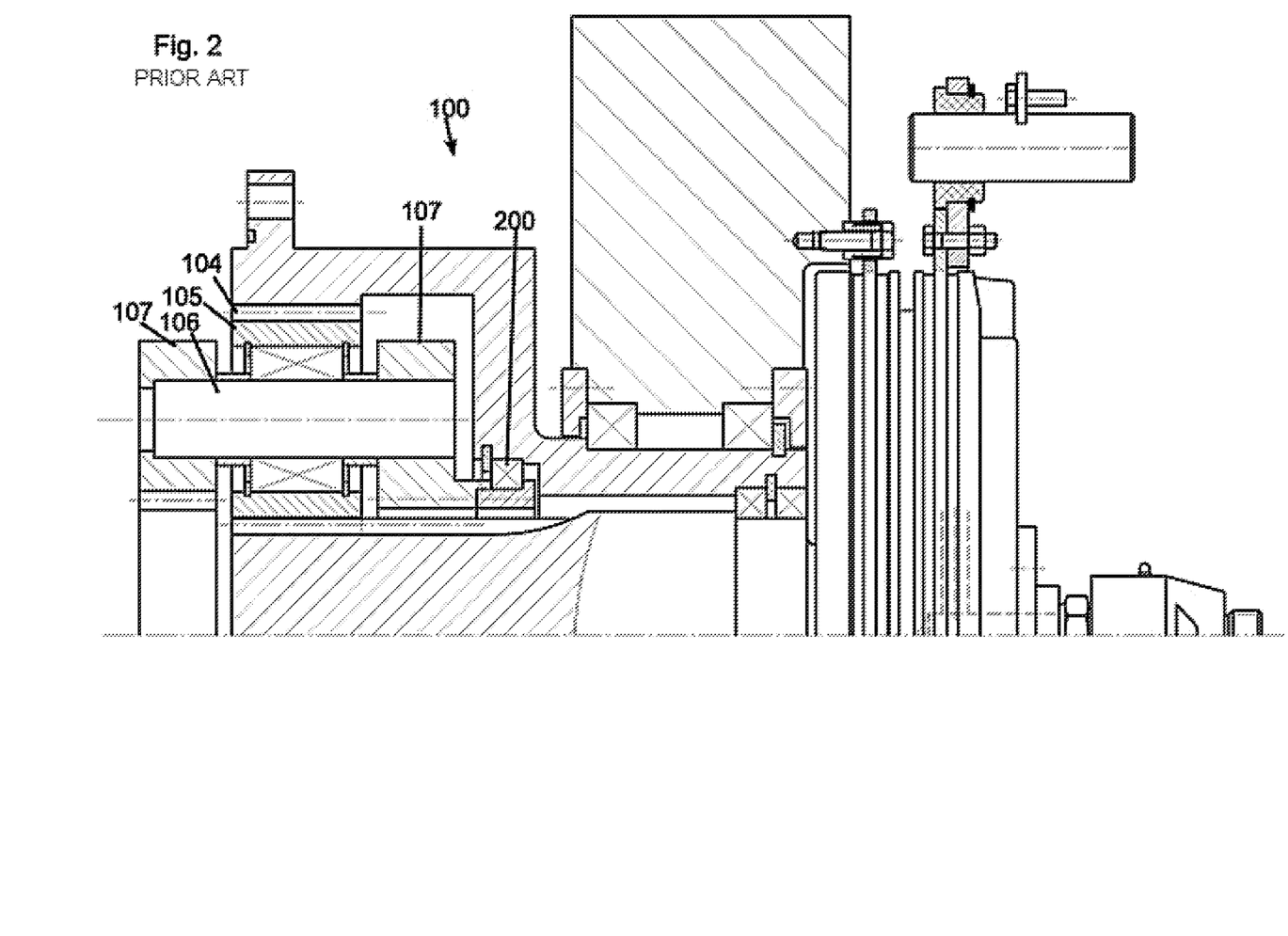
FIG. 2 shows a diagrammatic sectional drawing of a planetary transmission from the prior art.

Drive power is transmitted via a drive shaft 102 from a drive means (not shown) to the sun gearwheel 103 which is in engagement with the planetary gearwheels 105. It is also possible that the sun gearwheel 103 and the drive shaft 102 are configured integrally or in one piece. The planetary gearwheels 105 are in turn in engagement with the internal gearwheel 104. Upon rotation of the sun gearwheel, the planetary gearwheels 105 are set in rotation about the respective planetary shaft 106. On account of their engagement with the internal gearwheel 104 and the fastening of the planetary shafts 106 to the planetary carrier 107, the planetary carrier 107 then rotates coaxially with respect to the drive shaft 102 and with respect to the sun gearwheel 103. The planetary carrier 107 serves as an output shaft of the planetary transmission 100 and transmits the drive power to the work machine 101.

The driveshaft 102 can be connected via a clutch K to a flywheel 108, with the result that drive power which is generated by a motor can be transmitted via the flywheel 108 to the driveshaft 102. Here, the motor can be, in particular, a synchronous motor (servomotor) or an asynchronous motor.

Moreover, the planetary transmission 100 comprises a bearing means 200 which serves to mount the planetary carrier 107.

Figure 3:
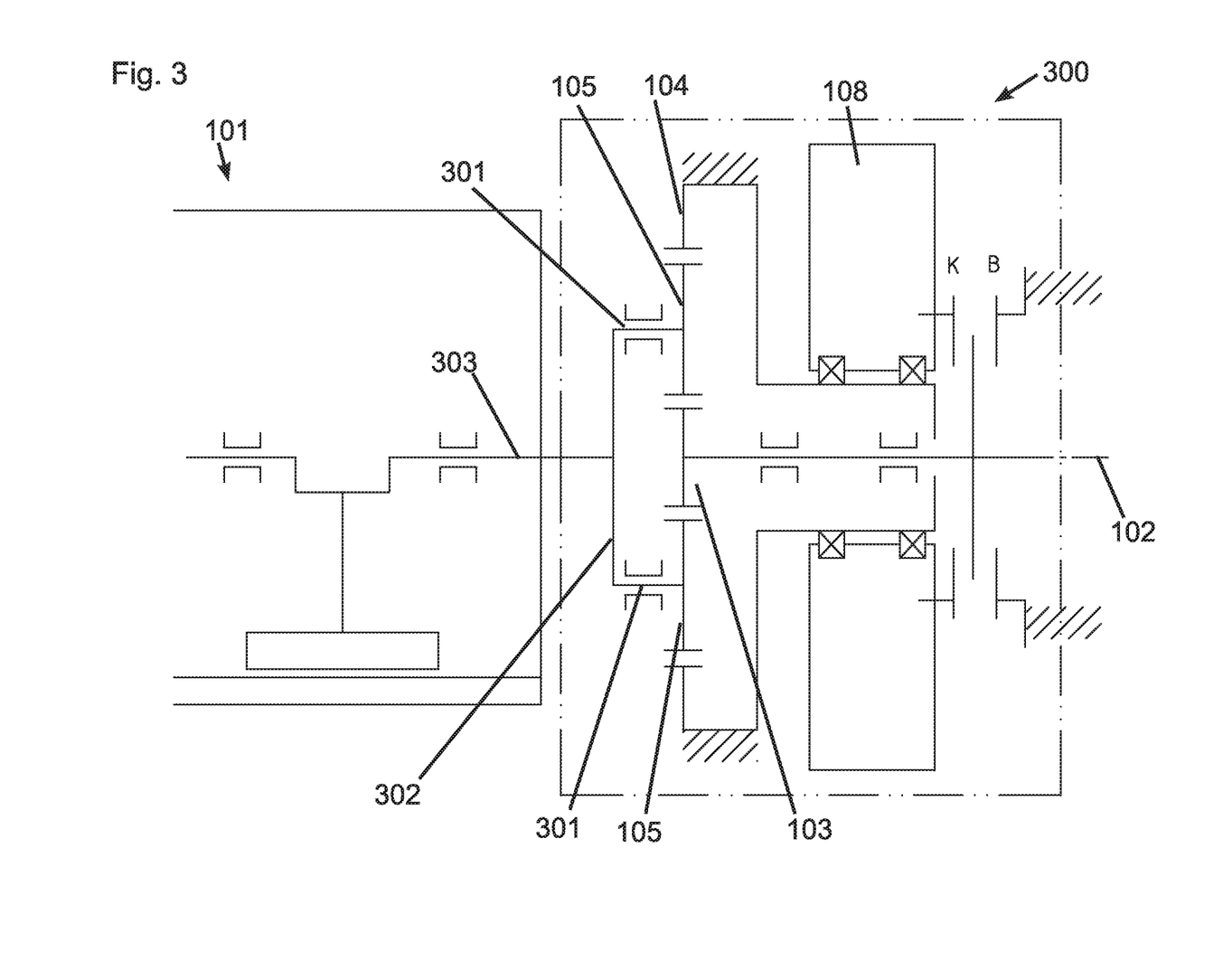
FIG. 3 shows a diagrammatic simplified sectional illustration of a planetary transmission according to one embodiment of the invention.
Figure 4:
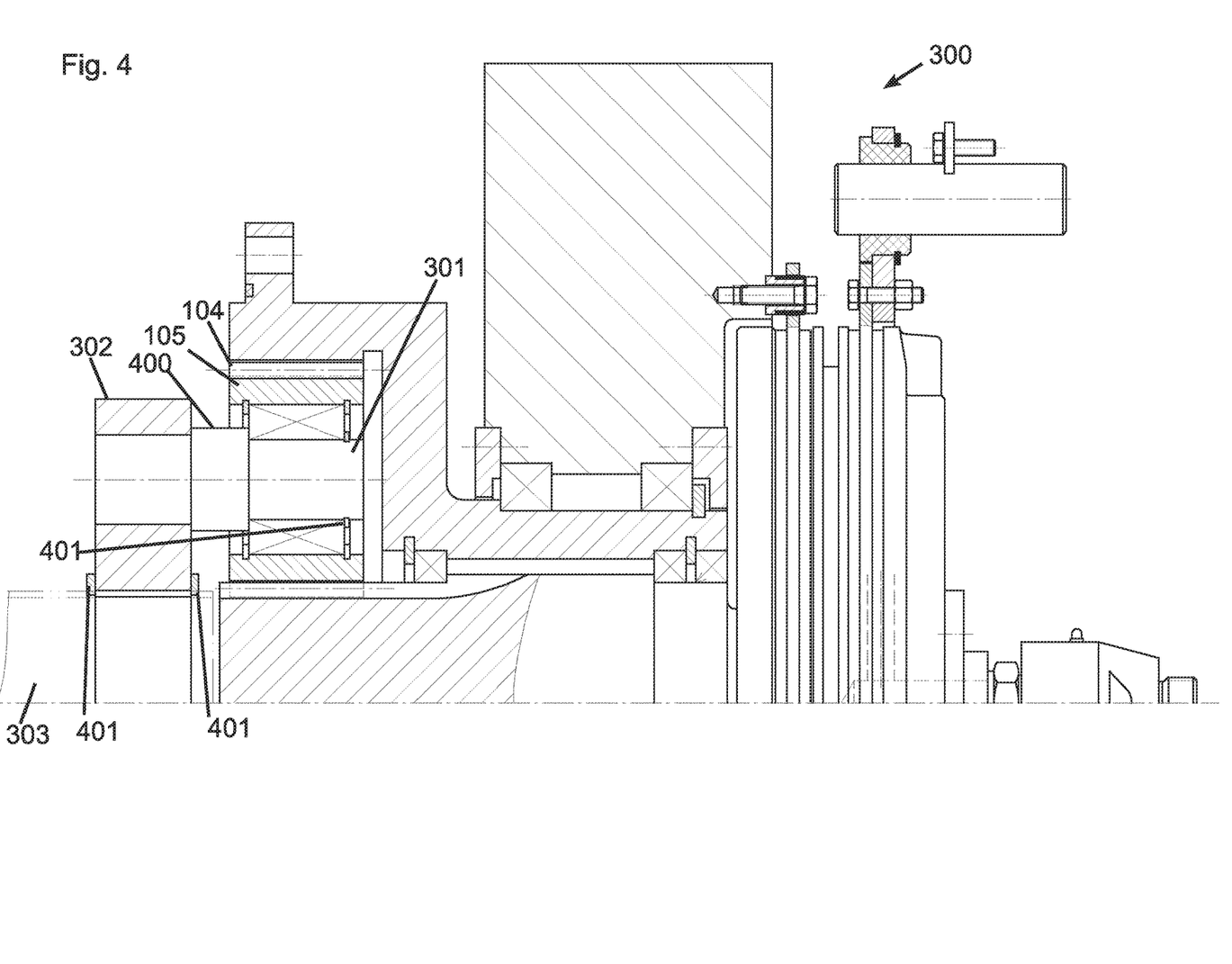
FIG. 4 shows a diagrammatic sectional illustration of a planetary transmission according to one embodiment of the invention.

A comparison of FIG. 3 with FIG. 1 and a comparison of FIG. 4 with FIG. 2 are recommended in order to compare the embodiments of the invention which are shown in FIGS. 3 and 4 with the prior art.

The planetary transmission 300 which is shown in FIGS. 3 and 4 is of similar construction to the planetary transmission 100 from FIGS. 1 and 2. One difference consists in that the planetary transmission 300 comprises planetary shafts 301 instead of the planetary shafts 106 and a planetary carrier 302 instead of the planetary carrier 107. One special feature is that the planetary shafts 301 are fastened in each case only with precisely one end 400 to the planetary carrier 302. That end of the planetary shafts 301 which lies opposite the end 400 lies freely. The bearing means 200 is therefore dispensed with in the case of the planetary transmission 300. The planetary carrier 302 is therefore mounted in a freely floating manner on the work machine shaft 303.

The planetary carrier 302 therefore has a lower weight in comparison with the planetary carrier 107 which is known from the prior art. This is advantageous, in particular, since the weight which is saved in the case of the planetary carrier 107 lies very far to the outside during a rotation. The moment of inertia of the planetary carrier 302 is therefore much lower than the moment of inertia of the known planetary carrier 107, which makes itself felt advantageously, for example, in a braking angle reduction of the work machine shaft 303. Moreover, the assembly of the planetary transmission 300 is simplified and production costs are lowered.

The planetary carrier 302 has an internal toothing system which is in engagement with an external toothing system of a work machine shaft 303 of the work machine 101. This achieves a reliable positively locking fastening. Moreover, a reduction of radial movements in the planetary carrier 302 is achieved by way of a low construction-induced play of the toothing system.

Securing rings 401 are used to secure the planetary carrier 302 against an axial displacement relative to the work machine shaft 303. The planetary carrier 302 is therefore mounted on the work machine shaft 303 in a floating manner. Mounting of the planetary carrier 302 via the bearing means 200 is dispensed with in comparison with the planetary carrier 107 which is known from the prior art (see FIGS. 1 and 2).

It can be seen in FIG. 4, moreover, that the planetary carrier 302 is arranged outside a housing of the planetary transmission 300, as a result of which assembly and maintenance of the planetary transmission 300 are simplified. Moreover, the planetary gearwheels 105, the planetary shafts 301 and the planetary carrier 302 form a first module which can be plugged into the cavity which is surrounded by the internal gearwheel 104. In the plugged-in-state, the internal toothing system of the internal gearwheel 104 engages into the external toothing systems of the planetary gearwheels 105, as a result of which positively locking connection is achieved.

The planetary carrier 302 can be fastened releasably to the work machine shaft 303. Both assembly and dismantling of the planetary transmission are simplified as a result. In a first step, the planetary carrier 302 with the planetary shaft 301 fastened thereto and the planetary gearwheels 105 can be fastened as a first module to the work machine shaft in a releasable manner. Subsequently, the remaining components of the planetary transmission 300 can be fastened to the first module. Said modular design simplifies, in particular, the maintenance of the planetary transmission 300.

The first module which is fastened to the work machine shaft 303 can be removed from the planetary transmission 300 in a simple way, since the positively locking connection of the planetary gearwheels 105 to the internal gearwheel 104 can be released. The assembly, maintenance and repair of the planetary transmission 300 are therefore simplified considerably, since the plug-in connection between the first module and the internal gearwheel 104 can be released without great complexity.

Figure 5:
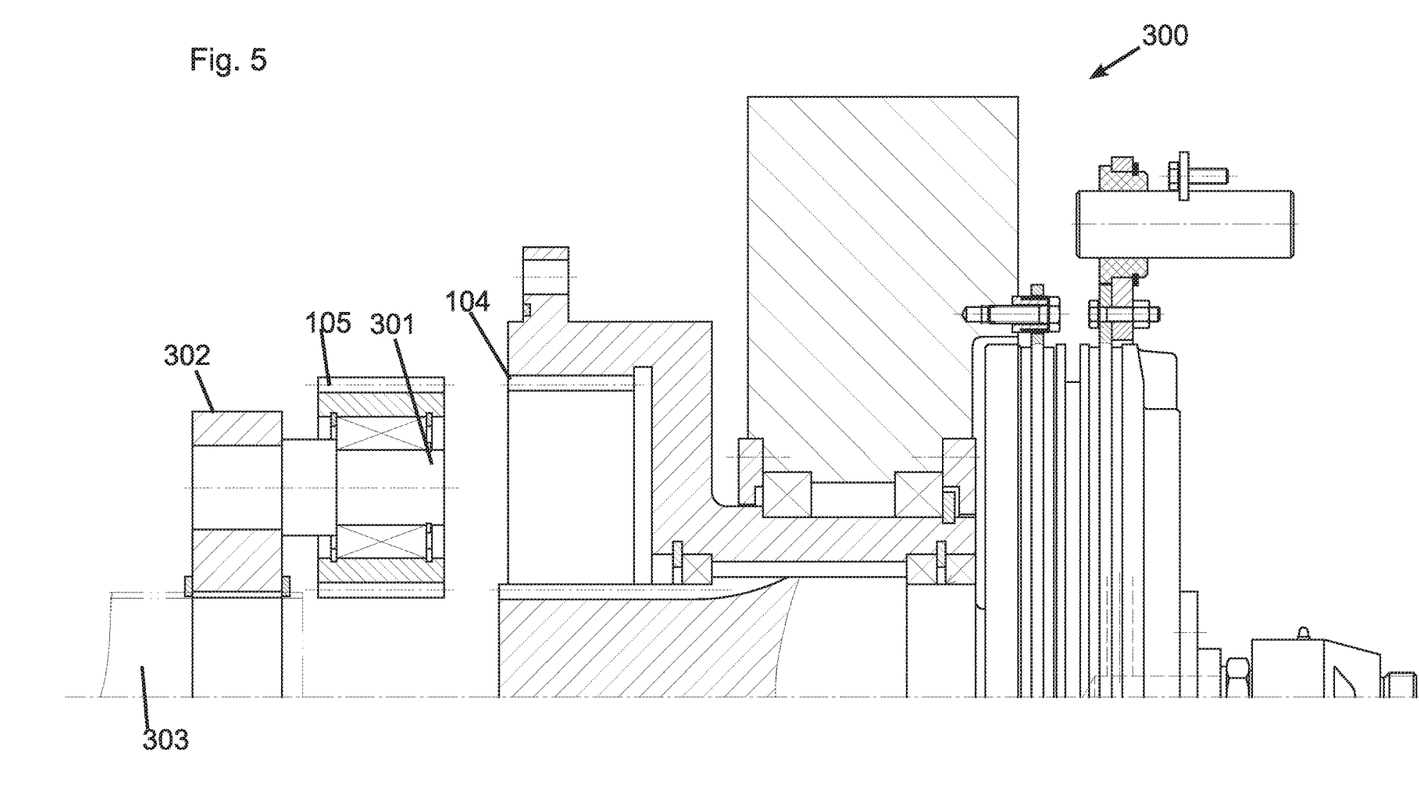
FIG. 5 shows a diagrammatic sectional drawing of the planetary transmission from FIG. 4 in the partially dismantled state.

FIG. 5 shows the planetary transmission 300 in a state, in which the connection between the first module, which comprises the planetary gearwheels 105, the planetary shafts 301 and the planetary carrier 302, and the internal gearwheel 104 is released. The first module can thus be removed easily from the cavity which is surrounded by the internal gearwheel 104. Since the connection between the first module and the internal gearwheel 104 is a plug-in connection, the release of said connection can be carried out particularly simply. The maintenance, repair, assembly and dismantling of the first module can thus be carried out without great complexity.

The system comprising the work machine and the planetary transmission can be assembled in the following way. First of all, the planetary gearwheels 105, the planetary shafts 301 and the planetary carrier 302 are assembled as a first module. The first module is then fastened releasably to the work machine shaft 303. Subsequently, the first module is fastened releasably to the internal gearwheel 104. Said assembly can be carried out particularly easily, since the first module can simply be pushed partially into the cavity which is surrounded by the internal gearwheel 104, and configures a positively locking connection to the internal gearwheel 104 there. It goes without saying that, as an alternative, the internal gearwheel 104 with the remaining components of the planetary transmission 300 which are fastened thereto can also be pushed over the first module. A positively locking connection between the first module and the internal gearwheel 104 can also then be configured, by the external toothing systems of the planetary gearwheels 105 engaging into the internal toothing system of the internal gearwheel 104.

LIST OF DESIGNATIONS

100 Planetary transmission (prior art)
101 Work machine
102 Drive shaft
103 Sun gearwheel
104 Internal gearwheel
105 Planetary gearwheel
106 Planetary shaft
107 Planetary carrier
108 Flywheel
200 Bearing means
300 Planetary transmission
301 Planetary shaft
302 Planetary carrier
303 Work machine shaft
400 End
401 Securing ring
K Clutch
B Brake

What is claimed is:

1. A method for assembling a system comprising a planetary transmission and a work machine, wherein the planetary transmission comprises a first module including a plurality of planetary gearwheels, a plurality of planetary shafts and at least one planetary carrier, wherein each of the plurality of planetary shafts are fastened to the planetary carrier only at precisely one end of the respective planetary shaft, and a second module including an internal gearwheel and a sun gearwheel, and wherein the work machine is a press that includes a press shaft having a distal end, the method comprising the following steps:
releasably fastening the first module to the press shaft such that the planetary carrier is mounted on the distal end of the press shaft in a floating manner without radial support of a bearing; and
thereafter, releasably fastening the first module to the second module.

2. A planetary transmission for transmitting drive power to a work machine having a work machine shaft with a distal end, comprising: a first module including a plurality of planetary gearwheels, a planetary carrier, and a plurality of planetary shafts; and a second module including an internal gearwheel and a sun gearwheel, wherein the planetary carrier is first mounted on the distal end of the work machine shaft in a floating manner without radial support of a bearing and configured for a releasable connection to the work machine shaft, and thereafter, the first module is releasably fastened to the second module; wherein each of the plurality of planetary shafts is fastened to the planetary carrier only at precisely one end of the respective planetary shaft, wherein each of the planetary gearwheels is arranged in each case rotatably on a respective one of the planetary shafts, and wherein the work machine is a press.

3. The planetary transmission of claim 2, wherein the planetary carrier is configured for a positively locking or non-positive connection to the work machine shaft.

4. The planetary transmission of claim 2, wherein the planetary carrier has an internal toothing system, the internal toothing system being configured to engage into an external toothing system of the work machine shaft.

5. The planetary transmission of claim 2, wherein the planetary transmission has a securing means, the planetary carrier being secured by way of the securing means against an axial displacement relative to the work machine shaft.

6. The planetary transmission of claim 2, wherein the planetary transmission has a clamping means, the clamping means being configured for fastening the planetary carrier to the work machine shaft.

7. The planetary transmission of claim 6, wherein the clamping means is configured as a clamping set.

8. The planetary transmission of claim 2, wherein an end of the respective planetary shaft, at which the planetary carrier is fastened, faces the work machine in an installed state.

9. The planetary transmission of claim 2, wherein the planetary transmission comprises a housing, the planetary carrier being arranged at least partially outside the housing.

10. The planetary transmission of claim 2, wherein the planetary carrier is configured as an output shaft or comprises an output shaft, the output shaft being configured to transmit the drive power to the work machine.

11. A system, comprising:
a drive means; and
the work machine and the planetary transmission according to claim 2, the planetary transmission being configured to transmit a power output provided by the drive means to the work machine.

12. The system of claim 11, wherein the system comprises a flywheel, a clutch and a brake, which system is configured to be driven by the drive means and to transmit the power output which is provided by the drive means to the planetary transmission.

13. The system of claim 12, wherein the system is configured to transmit the power output via the clutch.

14. The planetary transmission of claim 9, wherein the planetary carrier is arranged mostly outside the housing.

* * * * *